(12) United States Patent
Paxton et al.

(10) Patent No.: US 9,459,891 B1
(45) Date of Patent: Oct. 4, 2016

(54) INTERFACE FOR INTERPARTITION AND INTERPROCESSOR COMMUNICATION

(71) Applicants: Nicholas A. Paxton, Cedar Rapids, IA (US); Ramy W. Henin, Marion, IA (US); Paul C. Rodriguez, Jr., Marion, IA (US)

(72) Inventors: Nicholas A. Paxton, Cedar Rapids, IA (US); Ramy W. Henin, Marion, IA (US); Paul C. Rodriguez, Jr., Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 555 days.

(21) Appl. No.: 13/839,183

(22) Filed: Mar. 15, 2013

(51) Int. Cl.
*G06F 9/455* (2006.01)

(52) U.S. Cl.
CPC ..................... *G06F 9/455* (2013.01)

(58) Field of Classification Search
CPC .............................. G06F 9/5061; G06F 21/51
USPC ......................................................... 709/233
See application file for complete search history.

(56) References Cited

U.S. PATENT DOCUMENTS

| | | | |
|---|---|---|---|
| 8,316,368 B2 | 11/2012 | Vestal et al. | |
| 2002/0144010 A1 | 10/2002 | Younis et al. | |
| 2008/0115150 A1 | 5/2008 | Jagana et al. | |
| 2009/0083734 A1* | 3/2009 | Hotra | G06F 21/51 718/1 |
| 2011/0055518 A1* | 3/2011 | Hotra | G06F 9/5061 712/29 |
| 2013/0166271 A1* | 6/2013 | Danielsson | G06F 11/3664 703/22 |

* cited by examiner

*Primary Examiner* — Brendan Higa
*Assistant Examiner* — Leon Y Tseng
(74) *Attorney, Agent, or Firm* — Daniel M. Barbieri; Donna P. Suchy; Angel N. Gerzhikov

(57) ABSTRACT

A system for reading and writing data to virtual machines in a machine operating according to the ARINC 653 standard includes a plurality of virtual machines that intercommunicate and communicate over a bus. A data interceptor is connected to the bus for communication with each virtual machine by reading and writing data to each virtual machine.

19 Claims, 4 Drawing Sheets ered to here as "ARINC 653") to host multiple applications on different software levels on the same hardware.
INTERFACE FOR INTERPARTITION AND INTERPROCESSOR COMMUNICATION The U.S. Government has a paid-up license in this invention and the right in limited circumstances to require the patent owner to license others on reasonable terms as provided for by the terms of contract No. DAAH23-03-D-0015 awarded by the U. S. Department of Defense.

FIELD

The present invention relates to communication between software applications, and more particularly, this invention relates to reading and writing data to virtual machines in a processor operating with Real-time Operating Systems that implement ARINC 653 concepts, including intra-processor communication.

BACKGROUND

In modern avionics systems, partitioning operating systems are typically used to meet critical safety and mission requirements. Aeronautical Radio Inc. (ARINC) has promulgated the "ARINC Specification 653: Avionics Application Standard Software Interface" family of specifications (generally referred to here as "ARINC 653") to host multiple applications on different software levels on the same hardware.

ARINC 653 defines an Application EXecutive (APEX) for space and time partitioning for enabling multiple partitions to share a single processor and memory in order to guarantee that applications executing within one partition cannot adversely affect other partitions in the event of an application failure. Each partition in the ARINC 653 system represents a separate application and makes use of dedicated memory space. Similarly, the APEX allots a dedicated time slice to each partition for time partitioning. All ARINC 653 data is internal to the processor and cannot be monitored or injected from an external source. In this regard, ARINC 653 governs only intra-processor communication.

The processor industry is transitioning to multi-core and multi-processor systems for various reasons. Increasing the number of processors and processor cores permits more partitions to be created in a network component, with each partition configured as a virtual machine and executing its own programs. These virtual machines can intercommunicate with each other leading to an increase in operating efficiencies, but they are limited from being able to easily monitor and troubleshoot the network component. Data can only be captured and injected from the Avionics System LAN ("ASL"), making each processor a "black box" that masks operation of the internal virtual machines.

SUMMARY

The present invention provides a system and method that allows the ARINC 653 data in an ARINC 653 network to be viewed and stimulated from an external source before ARINC 653 data reaches its destination.

The present invention provides a system for reading and writing data to virtual machines in a processor operating according to the ARINC 653 standard. The system includes a processor having a plurality of virtual machines that intercommunicate and communicate over a bus. A data interceptor is connected to the bus for communication with each virtual machine by reading and writing data to each virtual machine.

In another embodiment, the data interceptor facilitates inter-processor communication pursuant to the ARINC 653 standard. The data interceptor can be positioned between the virtual machines in the processor and other machines on an avionics network to read and write ARINC 653 data to the other machines.

Other features and aspects of the invention will become apparent upon review of the following description taken in connection with the accompanying drawings. The invention, though, is pointed out with particularity by the appended claims.

DRAWINGS

DETAILED DESCRIPTION

Figure 1:
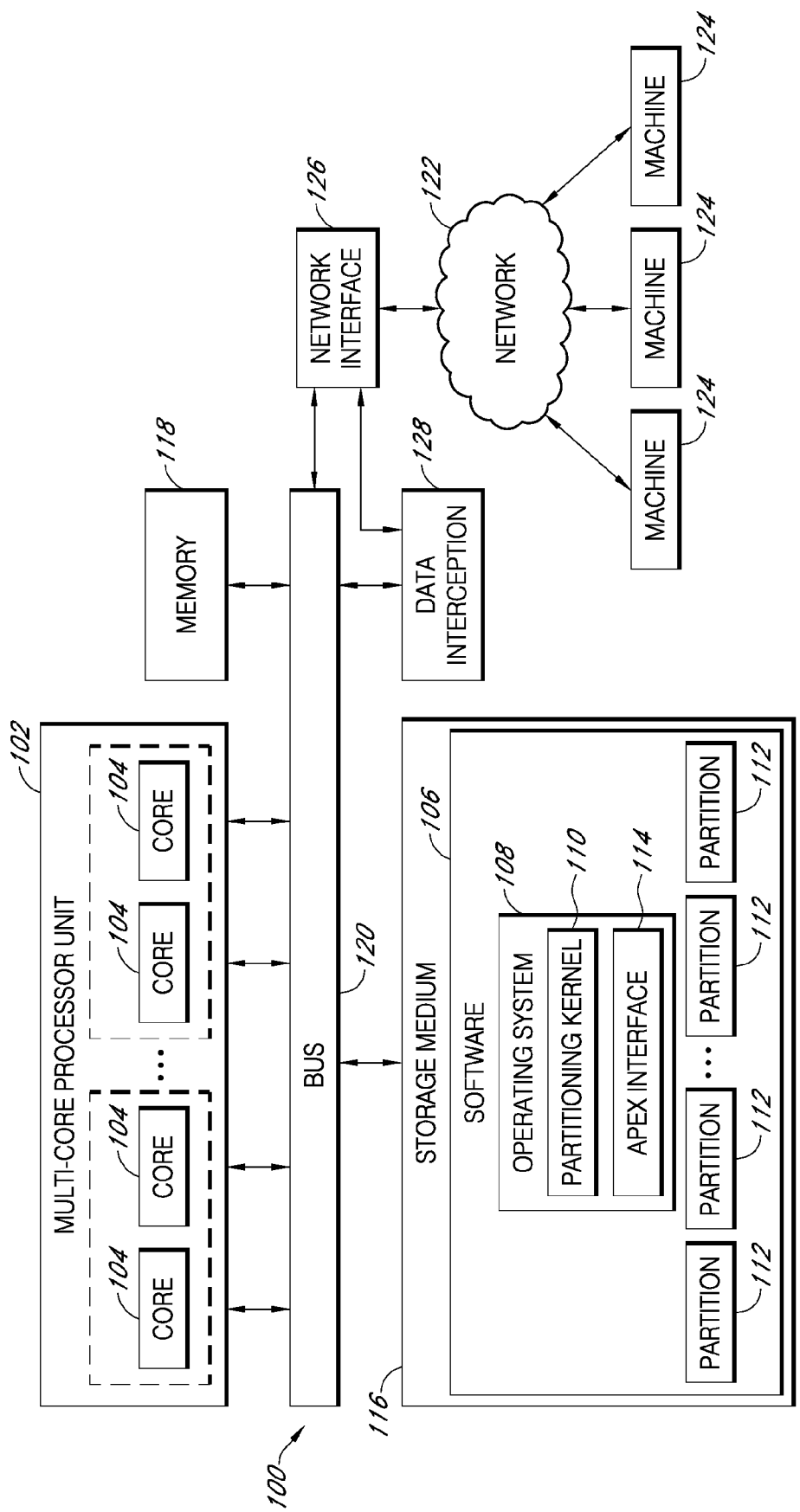
FIG. 1 is a block diagram of a system with a multi-partition architecture and a data interceptor for monitoring inter-partition communication.

FIG. 1 is a block diagram of a system 100 that allows the ARINC 653 data in an ARINC 653 network to be viewed and stimulated from an external source before ARINC 653 data reaches the ASL. System 100 has a multi-core processor configured to create a plurality of virtual machines used to implement an avionics system pursuant to the ARINC 653 standard, although it is to be understood that the system 100 can be implemented with a single-core processor and in other ways. System 100 includes a multi-core processor unit 102. The multi-core processor unit 102 comprises multiple processor cores 104. Each processor core 104 can execute software 106.

Software 106 includes an operating system 108 with a partitioning kernel 110 and an application executive (APEX) interface 114, each of which supports the ARINC 653 specification. Partitioning kernel 110 manages and controls access to resources and implements the partitioning functions necessary for operating system 108 to carry out space and time partitioning required by the ARINC 653 standard. APEX interface 114 provides an interface between the partitioning kernel 108 (and the resources accessible therethrough) and partition software 112 that executes in the various partitions that are provided by the partitioning kernel 110.

The software 106 can be stored on or in a storage medium 116. The program instructions with software 106 can be read and executed by the appropriate core 104. The program instructions, when executed by the respective core 104, can carry out at least a portion of the functionality described here as being performed by the system 100.

Cores 104 are coupled to a local memory 118, which is implemented using appropriate memory devices (such as random-access memory (RAM) devices such as dynamic and static RAM devices and read-only memory (ROM) devices). Each core 104 communicates with memory 118 over bus 120. Although software 106 is shown as being stored on or in a storage medium 116 that is separate from the memory 118, it is to be understood that at least a portion the software 106 (and corresponding portions of the storage medium 116) can be in the memory 118.

System 100 has a network interface 126 that it uses to communicate over an avionics ASL Network 122 to other machines 124.

Multi-core processor unit 102 is configured so that each core 104 executes a sequence of instructions for only one partition at any given time. In each such partition, corresponding partition software 112 is executed on one of the plurality of cores 104 of the multi-core processor unit 102. There is a corresponding dedicated portion of the memory 118 that is used by the respective partition software 112 executing in that partition. In this regard, there are multiple logical partitions in system 100 each representing a "virtual machine" 130 (shown in FIG. 2) that executes its own partition software 112.

The ARINC 653 standard enables virtual machines 130 to execute their own applications and communicate with each other. A data interceptor 128 can be selectively coupled to bus 120 through an I/O port to read and write data on bus 120 for processing by virtual machines 130. Each virtual machine 130 in system 100 can be tested by monitoring its input and output with data interceptor 128.

Figure 2:
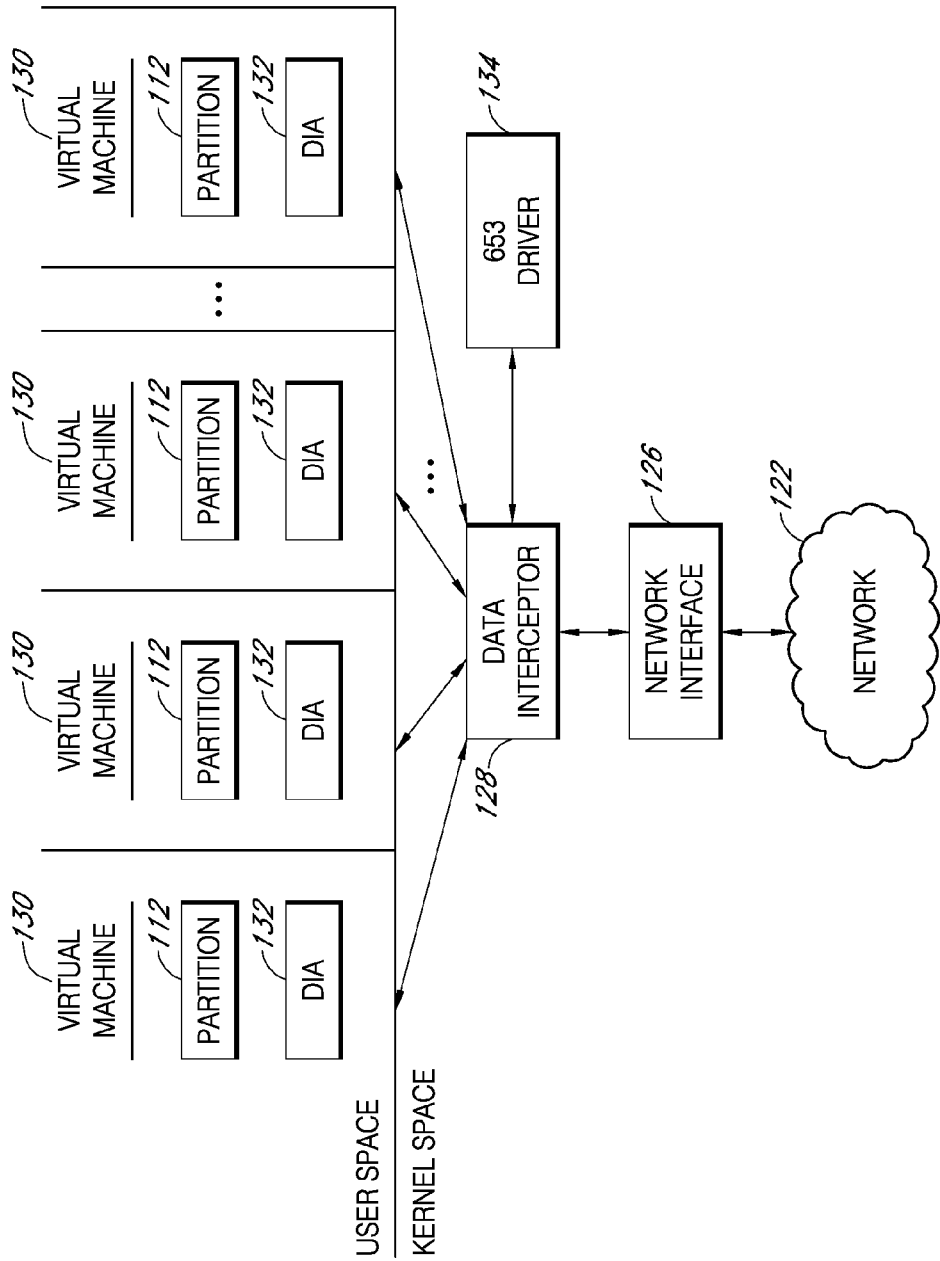
FIG. 2 is a block diagram illustrating how the data interceptor of FIG. 1 is used to read and write data to the partitions.

FIG. 2 shows how data interceptor 128 can read and write data directly to virtual machines 130. Software 106 further includes data interceptor application software ("DIA") 132, which executes in the various partitions that are monitored. Each virtual machine 130, therefore, has partition software 112 and DIA 132. DIA 132 on virtual machine 130 enables each virtual machine 130 to communicate directly (either by reading or writing data) with data interceptor 128. DIA 132 can include configuration and load files and tables and other software to configure virtual machines 130, so data interceptor 128 can read and write data to virtual machines 130.

Data interceptor 128 is positioned between each virtual machine 130 and an ARINC 653 driver 134. This positions data interceptor 128 to intercept data before it reaches ASL Network 122.

Figure 3:
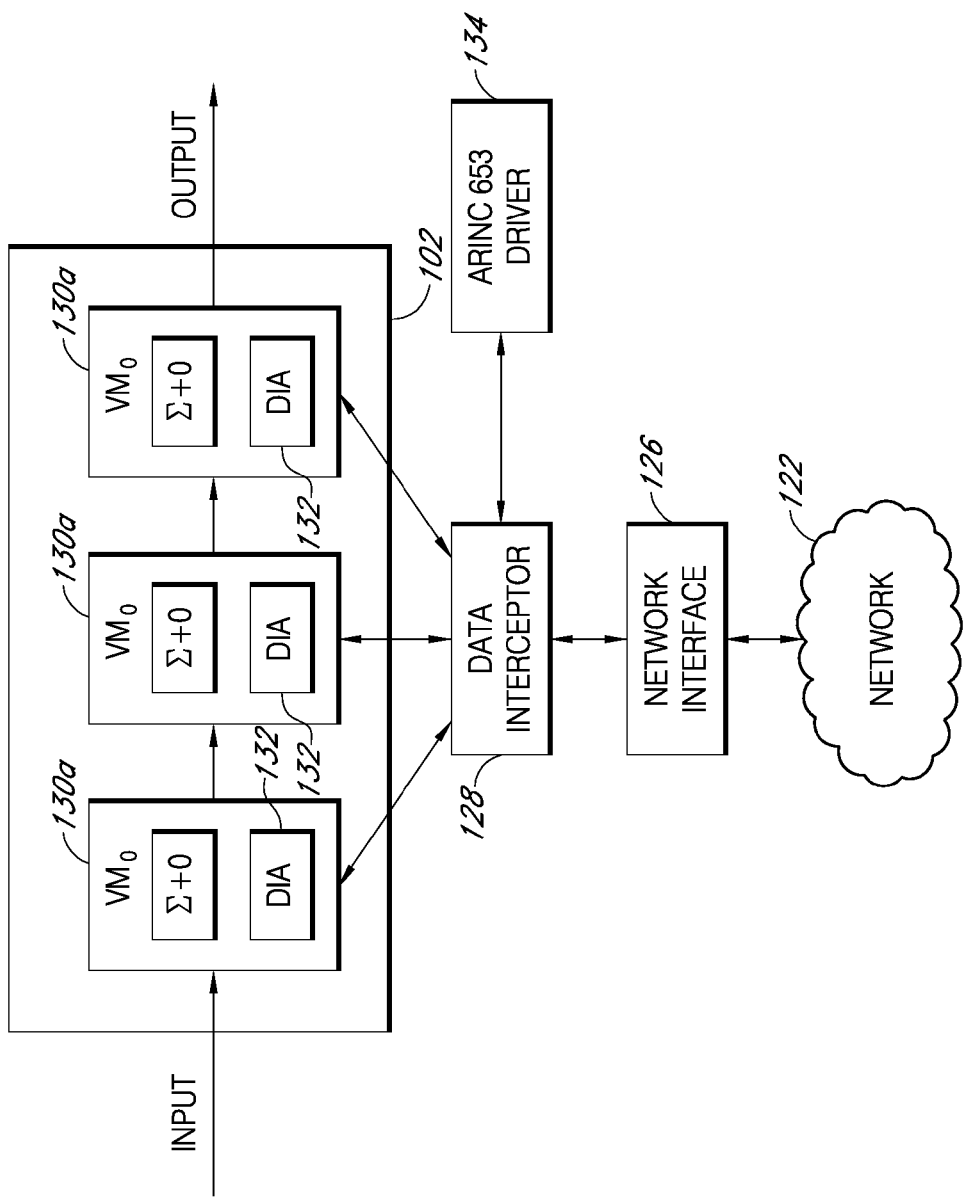
FIG. 3 is a block diagram illustrating how the data interceptor of FIG. 1 reads and writes data to each partition to view the input and output of each partition.

FIG. 3 shows how data interceptor 128 reads and writes data to three virtual machines 130a, 130b, and 130c in processor 102. In a simplified example, each virtual machine 130a, 130b, and 130c runs a summing application. Virtual machine 130a sums zero to an input. Virtual machine 130b sums one to the output of virtual machine 130a. Virtual machine 130c sums two to the output of virtual machine 130b. Data interceptor 128 cooperating with DIA 132 executing on each virtual machine 130a, 130b, and 130c can read and write data to each virtual machine 130a, 130b, and 130c to independently test each virtual machine 130a, 130b, and 130c; for example, a one input to processor 102 should produce a four at the output of processor 102. Data interceptor can write a one to an input to virtual machine 130b and read its output. If the output is not two, then an operator would know that virtual machine 130b is not functioning appropriately. This is an overly simplified example. One skilled in the art would recognize this example could be expanded to more complex software functions.

Data interceptor 128 allows independent monitoring or testing of each virtual machine 130a, 130b, and 130c to determine whether any one of virtual machines 130a. 130b, and 130c is operating incorrectly. Furthermore, because data interceptor 128 operates with the ARINC 653 standard and it can be positioned in the path of communication between processor 102 and other machines 124, inter-processor (i.e., inter-machine) communication using the ARINC 653 standard is allowed and enables developers to use ARINC 653, which is an industry standard, for inter-processor communication.

Figure 4:
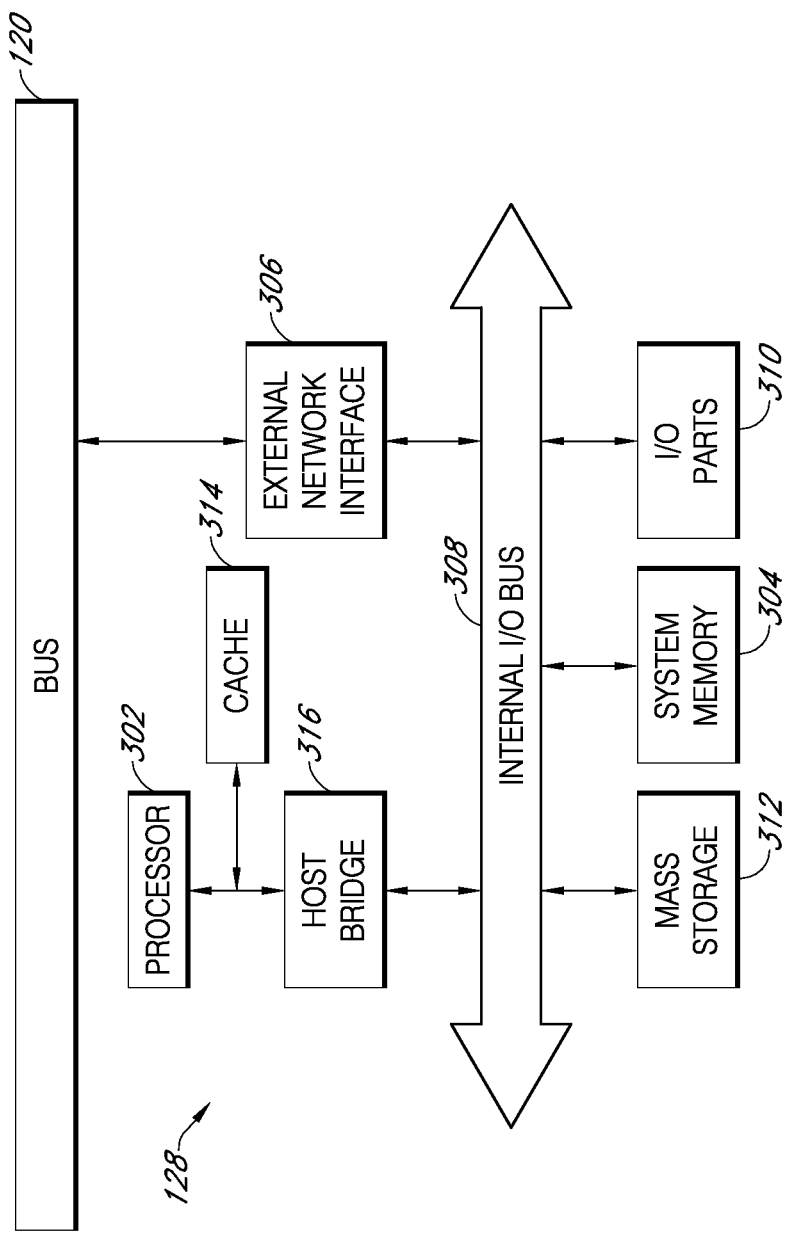
FIG. 4 is a functional block diagram illustrating hardware components of the data interceptor of FIG. 1, in accordance with an exemplary embodiment of the present invention.

FIG. 4 shows an exemplary data interceptor 128 that can be connected to bus 120 of system 100. In one implementation, data interceptor 128 includes a processor 302, a system memory 304, external network interfaces 306 and one or more software applications and drivers enabling or implementing the functions described herein. External network interface 306 connects data interceptor 128 to bus 120 of system 100. The hardware system includes a standard I/O bus 308 with I/O Ports 310 and mass storage 312 coupled thereto. Host bridge 316 couples processor 302 to I/O bus 308. The hardware system may further include video memory and a display device coupled to the video memory. Collectively, these elements are intended to represent a broad category of computer hardware systems, including but not limited to general purpose computer systems based on the Pentium processor manufactured by Intel Corporation of Santa Clara, Calif., as well as any other suitable processor.

Elements of the computer hardware system perform their conventional functions known in the art. Mass storage 312 is used to provide permanent storage for the data and programming instructions to perform the above-described functions of reading and writing data to virtual machines 130, whereas system memory 304 (e.g., DRAM) is used to provide temporary storage for the data and programming instructions when executed by processor 302. I/O ports 310 are one or more serial and/or parallel communication ports used to provide communication between additional peripheral devices, which may be coupled to data interceptor 128.

Data interceptor 128 may include a variety of system architectures, and various components of data interceptor 128 may be rearranged. For example, cache 314 may be on-chip with processor 302. Alternatively, cache 314 and processor 302 may be packed together as a "processor module," with processor 302 being referred to as the "processor core." Furthermore, certain implementations of the claimed embodiments may not require nor include all the above components. For example, additional components may be included in data interceptor 128, such as additional processors, storage devices, or memories.

The ARINC 653 standard enables virtual machines 130 to execute their own applications and communicate with each other. This intra-processor communication between virtual machines 130, however, was imperceptible until an output was provided to ASL Network 122. This limitation only permitted system 100 to be tested as a "black box" where only the input and output to system 100 could be determined. The operation of each virtual machine 130 was hidden from view. The foregoing disclosure enables testing through reading and writing data to each virtual machine 130 within processor 102. Furthermore, inter-processor or inter-machine communication with the ARINC 653 standard is allowed for all other purposes in addition to testing.

While the present invention has been particularly shown and described with reference to exemplary embodiments thereof, it should be understood by those of ordinary skill in the art that various changes, substitutions and alterations can be made herein without departing from the scope of the invention as defined by the appended claims and their equivalents.

What is claimed is:

1. A system comprising:
   a processor having a storage medium coupled to the processor with an ARINC 653 operating system software stored on the storage medium, wherein the processor executes the ARINC 653 operating system software and cooperates with the storage medium to create a plurality of virtual machines;

a bus connected to the processor for communication with the virtual machines;

an ARINC 653 driver for communicating with a network;

a data interceptor positioned between the bus and the ARINC 653 driver, wherein the data interceptor is connected to the bus and communicates with at least one of the plurality of virtual machines and intercepts the data before it reaches the network, wherein the plurality of virtual machines reside in a user space and the data interceptor resides in a kernel space defined by an ARINC 653 standard with the ARINC 653 driver.

2. The system of claim 1, wherein the processor has a plurality of cores that each executes an ARINC 653 operating system software and each cooperates with the storage medium to create the plurality of virtual machines.

3. The system of claim 2, wherein the data interceptor is connected to the bus and communicates with the plurality of cores and communicates directly by reading or writing data to at least one of the virtual machines.

4. The system of claim 3, wherein at least one of the virtual machines has operating therein a data interceptor application that enables the data interceptor to communicate with each virtual machine.

5. The system of claim 4, wherein the data interceptor selectively communicates with each of the virtual machines by reading and writing data to each of the virtual machines.

6. The system of claim 5, wherein the virtual machines intercommunicate with the other virtual machines and a data being communicated through the intercommunication between the virtual machines can only be monitored by an external source by having preinstalled on each of the intercommunicating virtual machines the data interceptor application.

7. A device configured to read and write data to at least one of a plurality of virtual machines established in a machine with a physical I/O port that is operating in accordance to an ARINC 653 standard, the device comprising:
　a processor;
　a storage medium coupled to the processor with an ARINC 653 operating system software stored on the storage medium, wherein the processor executes the ARINC 653 operating system software stored on the storage medium; and
　a network interface adapted to operatively connect the device to the physical I/O port of the machine for direct communication between the device and at least one of the virtual machines established in the machine and position the device between the virtual machines and an ARINC 653 driver to intercept a data before it reaches the network.

8. The device of claim 7, wherein the machine has a processor with a plurality of cores and each of the cores executes the ARINC 653 operating system software and the device communicates with the virtual machines established by the machine.

9. The device of claim 8, wherein the device selectively communicates directly with the virtual machines by reading and writing data to the virtual machines.

10. The device of claim 9, wherein at least one of the virtual machines has operating therein a data interceptor application that enables the virtual machines to communicate with the device.

11. The device of claim 10, wherein the virtual machines intercommunicate with the other virtual machines and a data being communicated through the intercommunication between the virtual machines can only be monitored by the device by having preinstalled on each of the intercommunicating virtual machines the data interceptor application.

12. The device of claim 11, wherein the data is ARINC 653 data.

13. A method for testing an input and an output of at least one virtual machine in a machine operating in accordance to an ARINC 653 standard, the method comprising:
　creating in the machine having an ARINC 653 operating system at least one virtual machine;
　providing a data interceptor application in a user space to communicate with the at least one virtual machine;
　using a data interceptor in a kernel space defined by an ARINC 653 standard to communicate with the data interceptor application in the user space of the at least one virtual machine in the machine;
　testing the at least one virtual machine with the data interceptor in the kernel space by communicating directly with the data interceptor application in the user space of the at least one virtual machine.

14. The method of claim 13, and further comprising using the data interceptor to intercept data destined to an ARINC 653 driver in the kernel space of the at least one virtual machine.

15. The method of claim 14, wherein the data interceptor application enables the at least one virtual machine to communicate externally to the machine, and the data interceptor is external to the machine.

16. The method of claim 13, wherein the at least one virtual machine has an input and an output, and further comprising using the data interceptor to write data to the input of the at least one virtual machine.

17. The method of claim 16, and further comprising reading data from the output of the at least one virtual machine in response to writing data to the input of the at least one virtual machine.

18. The method of claim 13, wherein the data is ARINC 653 data.

19. The method of claim 13, wherein the at least one virtual machine intercommunicates with other virtual machines and a data being communicated through the intercommunication between the virtual machines can only be monitored by the data interceptor by having preinstalled on each of the intercommunicating virtual machines the data interceptor application.

* * * * *

UNITED STATES PATENT AND TRADEMARK OFFICE
CERTIFICATE OF CORRECTION

| | | |
|---|---|---|
| PATENT NO. | : 9,459,891 B1 | Page 1 of 1 |
| APPLICATION NO. | : 13/839183 | |
| DATED | : October 4, 2016 | |
| INVENTOR(S) | : Nicholas A. Paxton et al. | |

It is certified that error appears in the above-identified patent and that said Letters Patent is hereby corrected as shown below:

Title Page Item 72 Inventor -- Paul C. RODRIGUEZ, Jr. -- is corrected to -- Paul C. RODRIGUEZ --.

Signed and Sealed this
Sixth Day of December, 2016

Michelle K. Lee
*Director of the United States Patent and Trademark Office*